(No Model.) 2 Sheets—Sheet 1.

E. W. CRACKNELL.
CLOSET OR PRIVY AND PAN THEREFOR.

No. 460,361. Patented Sept. 29, 1891.

Witnesses:

Inventor:
Edward William Cracknell
By Richards
his Attorneys.

(No Model.) 2 Sheets—Sheet 2.
E. W. CRACKNELL.
CLOSET OR PRIVY AND PAN THEREFOR.

No. 460,361. Patented Sept. 29, 1891.

Witnesses
E. B. Bolton

Inventor:
Edward William Cracknell.
By Richards
his Attorneys.

UNITED STATES PATENT OFFICE.

EDWARD WILLIAM CRACKNELL, OF SYDNEY, NEW SOUTH WALES.

CLOSET OR PRIVY AND PAN THEREFOR.

SPECIFICATION forming part of Letters Patent No. 460,361, dated September 29, 1891.

Application filed December 13, 1890. Serial No. 374,658. (No model.) Patented in New South Wales February 22, 1889, No. 1,261.

*To all whom it may concern:*

Be it known that I, EDWARD WILLIAM CRACKNELL, consulting engineer and architect, a subject of the Queen of Great Britain, residing at Bond Street Chambers, George Street, in the city of Sydney and British Colony of New South Wales, have invented new and useful Improvements Relating to Closets or Privies and to Pans Therefor, (for which a patent, No. 1,261, dated February 22, 1889, has been granted in New South Wales,) of which the following is a specification.

This invention has been specially devised in order that the escape of noxious gases and odors from the pans or receptacles of closets or privies may be practically prevented and that the pans or receptacles may be easily and quickly removed without causing nuisance.

These improvements relating to closets or privies and to pans therefor consist, first and essentially, in the combination and arrangement, with a pan or receptacle in a closet-box or cupboard, of a ring or washer of india-rubber or other suitable (and preferably elastic) material between the under side of the seat of said closet-box and the top of said pan or receptacle and crossed wedges or other means adapted to press said pan upward against said seat and to make an air-tight joint on the washer between them. They consist, secondly, in the combination and arrangement, with the cover of a closet-box or cupboard, of a ring or disk of india-rubber or other suitable (and preferably elastic) material adapted to make an air-tight joint on the closet-seat when said lid is closed.

But in order that this invention may be clearly understood, reference will now be made to the drawings herewith, in which—

Figure 1:
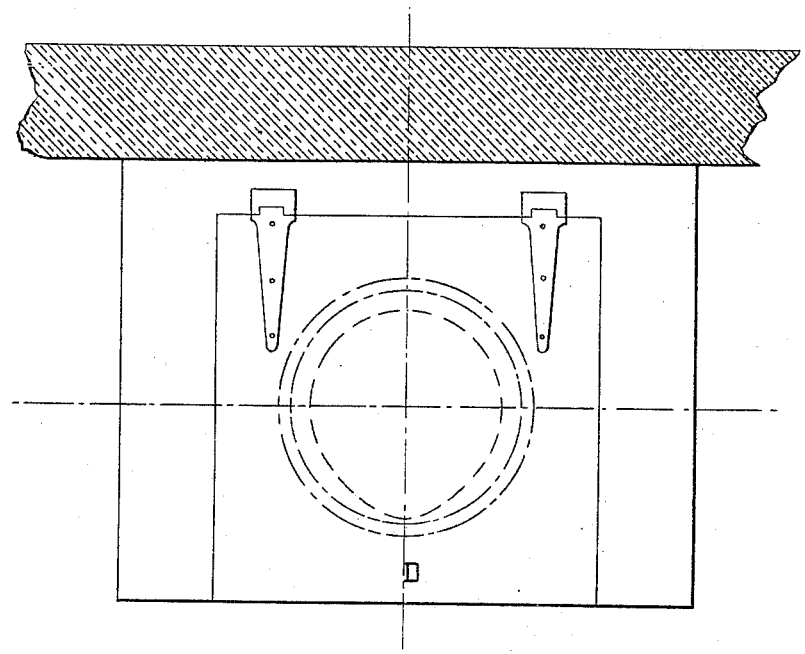
Figure 2:
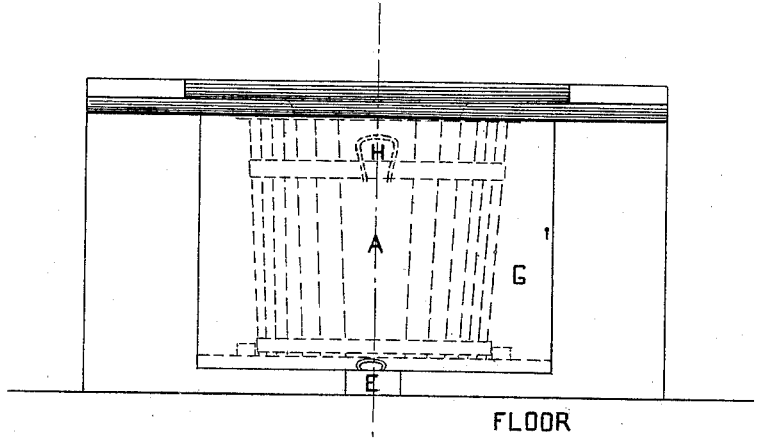
Figure 3:
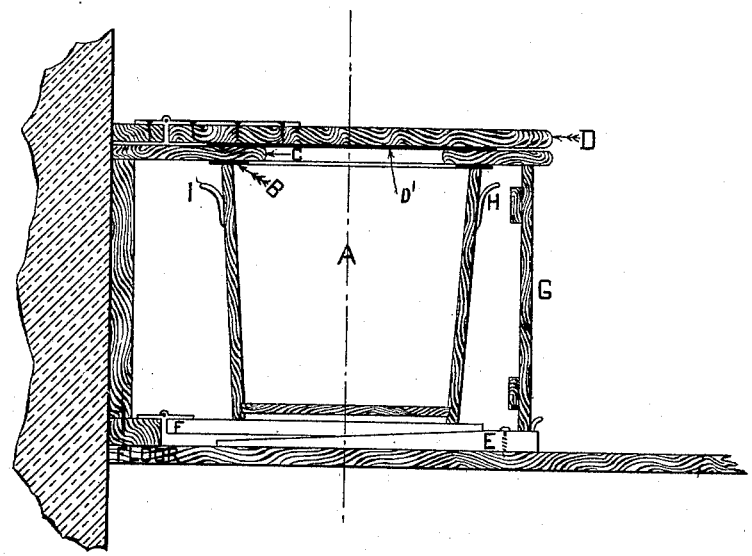
Figure 4:
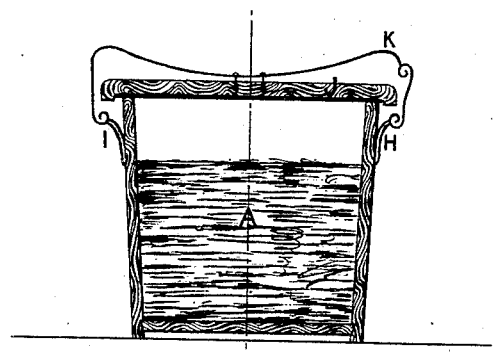

Figures 1, 2, and 3 are plan, elevation, and section, respectively, of the parts of a closet or privy necessary to show these improvements applied thereto. Fig. 4 is a cross-section of a closet-pan with a cover attached thereto.

A is a pan or receptacle; B, washer or ring of india-rubber; C, closet-seat; D, closet-cover; D', rubber disk; E, movable wedge; F, stationary or hinged wedge; G, door; H I, pan-handles; J, pan-cover; K, spring.

The pan, bucket-box, or receptacle A may be made of metal, wood, earthenware, or other impervious material, or of material rendered impervious by asphalt, paint, tar, rubber, varnish, or other substance. The pan A is pressed against ring or washer B, of rubber or other suitable (and preferably elastic) material, by driving or pushing wedge E on hinged wedge F or by other mechanical contrivances, raising the support of the pan or the pan itself, (where the available space is limited.) The upper flap or lid D, with the rubber or suitable elastic disk D' thereon, is pressed on the seat C by its own weight or by springs on its hinges, so as to form a gas-tight joint, which with the joint formed at B effectually prevents the escape of noxious gas or air from the closet-pan or receptacle. This pan A is removed by opening the door G, withdrawing the wedge E, and so releasing said pan from the ring or washer B. The pan, being drawn forward, is then covered with an air-tight cover, as shown in Fig. 4. The lid is provided with rubber or elastic washer to form a gas-tight joint and is kept in its place and pressed down by the spring K, which hooks on the handle I and clips the handle H. A clean pan being inserted through door G, the wedge E is tightened, as before described, and the closet is again ready for use. The door G may be placed in front, as shown, or at either side or back, in order to suit the requirements of the building, and where the sides are not available the receptacle may be removed by lifting up, in which case the seat C is furnished with a hinge and suitable clip or fastening.

Having now particularly described and explained the nature of my said invention and the manner in which the same is to be performed, I declare that what I claim is—

The combination, with a pan or receptacle A, the seat C, having an elastic washer or pad B, and seat D, having an elastic disk D', of a hinged support or wedge F and a horizontal movable wedge E, entirely separated from and engaging said hinged support, all adapted to form a tight joint between the vessel and the seat, and a door G, substantially as set forth.

EDWARD WILLIAM CRACKNELL.

Witnesses:
FRED. WALSH,
  *F. In. Inst., P. A.*
THOMAS JAMES WARD.